(12) United States Patent
Källberg

(10) Patent No.: US 7,543,611 B2
(45) Date of Patent: Jun. 9, 2009

(54) METHOD AND SYSTEM FOR REFUELLING

(75) Inventor: Sylvid Källberg, Vallentuna (SE)

(73) Assignee: Identic AB, Vallentuna (SE)

( * ) Notice: Subject to any disclaimer, the term of this patent is extended or adjusted under 35 U.S.C. 154(b) by 464 days.

(21) Appl. No.: 10/509,101

(22) PCT Filed: Apr. 5, 2002

(86) PCT No.: PCT/SE02/00681

§ 371 (c)(1),
(2), (4) Date: Jul. 18, 2005

(87) PCT Pub. No.: WO03/080500

PCT Pub. Date: Oct. 2, 2003

(65) Prior Publication Data

US 2006/0174971 A1 Aug. 10, 2006

(30) Foreign Application Priority Data

Mar. 26, 2002 (SE) .................................... 0200925

(51) Int. Cl.
*B65B 3/26* (2006.01)
*B65B 3/04* (2006.01)
*B67D 5/04* (2006.01)

(52) U.S. Cl. .............................. 141/1; 141/95; 141/198; 141/346; 141/348; 222/64

(58) Field of Classification Search ............ 141/1, 141/95, 346–352, 360, 198; 250/577, 227.24, 250/573–575; 116/227; 73/293; 137/558; 222/64; 359/726, 831, 833

See application file for complete search history.

(56) References Cited

U.S. PATENT DOCUMENTS

| 3,662,924 | A |   | 5/1972  | Crandall et al. |
|-----------|---|---|---------|-----------------|
| 3,864,577 | A |   | 2/1975  | Pellett et al.  |
| 4,033,389 | A | * | 7/1977  | Hansel et al. ............... 141/207 |
| 4,053,002 | A |   | 10/1977 | Ludlow          |
| 4,069,838 | A | * | 1/1978  | Hansel et al. ............... 137/392 |
| 4,155,013 | A | * | 5/1979  | Spiteri .................. 250/577 |
| 4,354,180 | A | * | 10/1982 | Harding .................. 340/619 |
| 4,469,149 | A | * | 9/1984  | Walkey et al. ............... 141/94 |
| 4,503,994 | A |   | 3/1985  | Pyle            |
| 4,598,742 | A | * | 7/1986  | Taylor ................... 141/95 |
| 4,840,137 | A |   | 6/1989  | Beauvais et al. |
| 4,934,419 | A | * | 6/1990  | Lamont et al. ............... 141/94 |

(Continued)

FOREIGN PATENT DOCUMENTS

EP 0697370 2/1996

(Continued)

*Primary Examiner*—Timothy L Maust
*Assistant Examiner*—Nicolas A Arnett
(74) *Attorney, Agent, or Firm*—Young & Thompson

(57) ABSTRACT

Method for spill free refuelling includes establishing a liquid tight connection between a refuelling gun nozzle for fuel dispensing and a coupling piece of the fuel receiving object (6), through which fuel is provided to a fuel container (7), detecting a predetermined fuel level (8') and automatically interrupting the fuel flow when said level is detected. A level detection signalling configuration is established by moving the gun into position for establishment of the liquid-tight connection. The invention further relates to a system for spill free refuelling, a method and a device for detecting a predetermined liquid fuel level and a fuel pipe arrangement.

46 Claims, 5 Drawing Sheets

U.S. PATENT DOCUMENTS

| | | | | |
|---|---|---|---|---|
| 4,998,022 A | * | 3/1991 | Tregay | 250/577 |
| 5,110,205 A | * | 5/1992 | Suzuki et al. | 356/135 |
| 5,249,612 A | * | 10/1993 | Parks et al. | 141/219 |
| 5,399,876 A | * | 3/1995 | LaClair | 250/577 |
| 5,431,199 A | * | 7/1995 | Benjay et al. | 141/59 |
| 5,507,326 A | * | 4/1996 | Cadman et al. | 141/198 |
| 5,655,577 A | * | 8/1997 | Loen et al. | 141/59 |
| 5,785,100 A | | 7/1998 | Showalter et al. | |
| 5,880,480 A | | 3/1999 | Ellinger et al. | |
| 5,944,069 A | * | 8/1999 | Nusbaumer et al. | 141/94 |
| 6,239,875 B1 | * | 5/2001 | Verheijen | 356/436 |
| 6,253,803 B1 | * | 7/2001 | Nusbaumer et al. | 141/94 |

FOREIGN PATENT DOCUMENTS

| | | |
|---|---|---|
| GB | 2138947 | 10/1984 |
| JP | 62-287899 | 12/1987 |
| JP | 1-196415 | 8/1989 |
| JP | 2-57815 | 2/1990 |
| WO | WO 9719339 | 5/1997 |

* cited by examiner

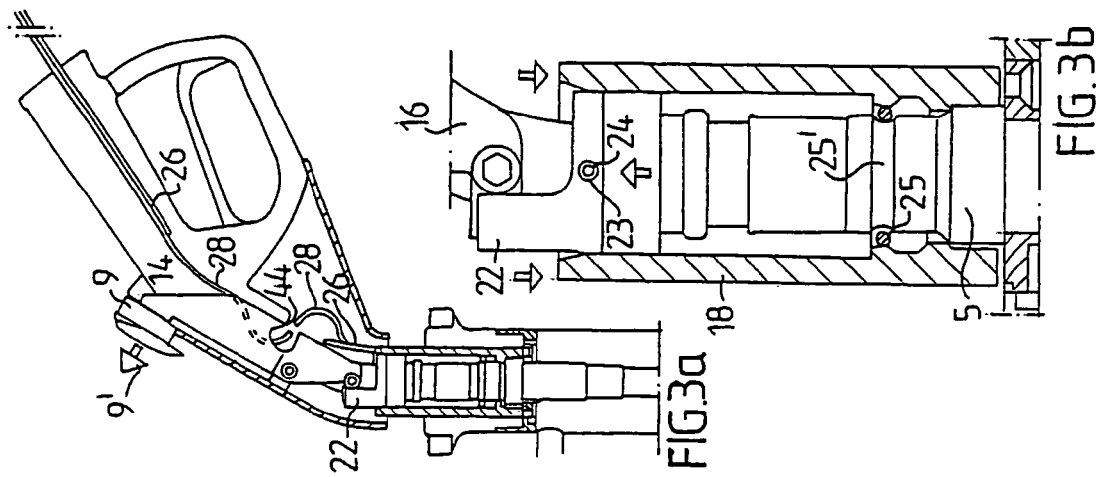
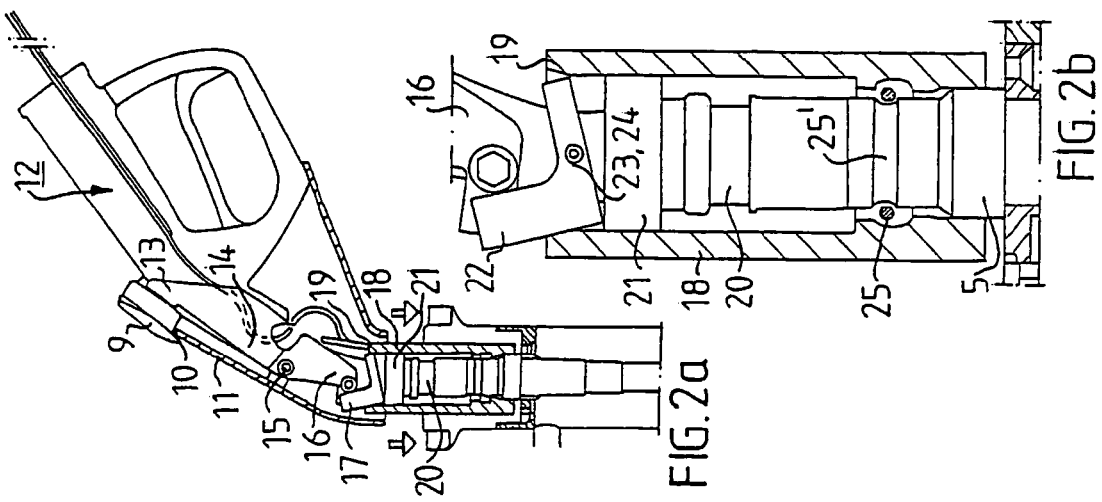
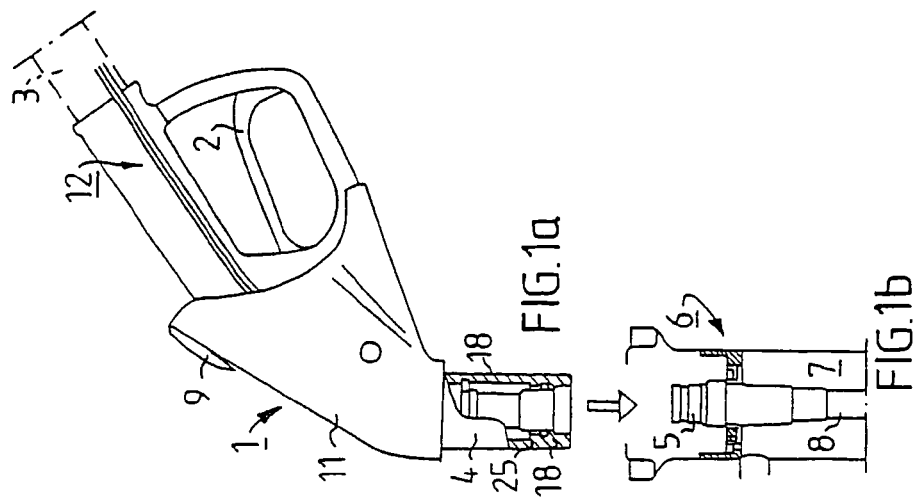

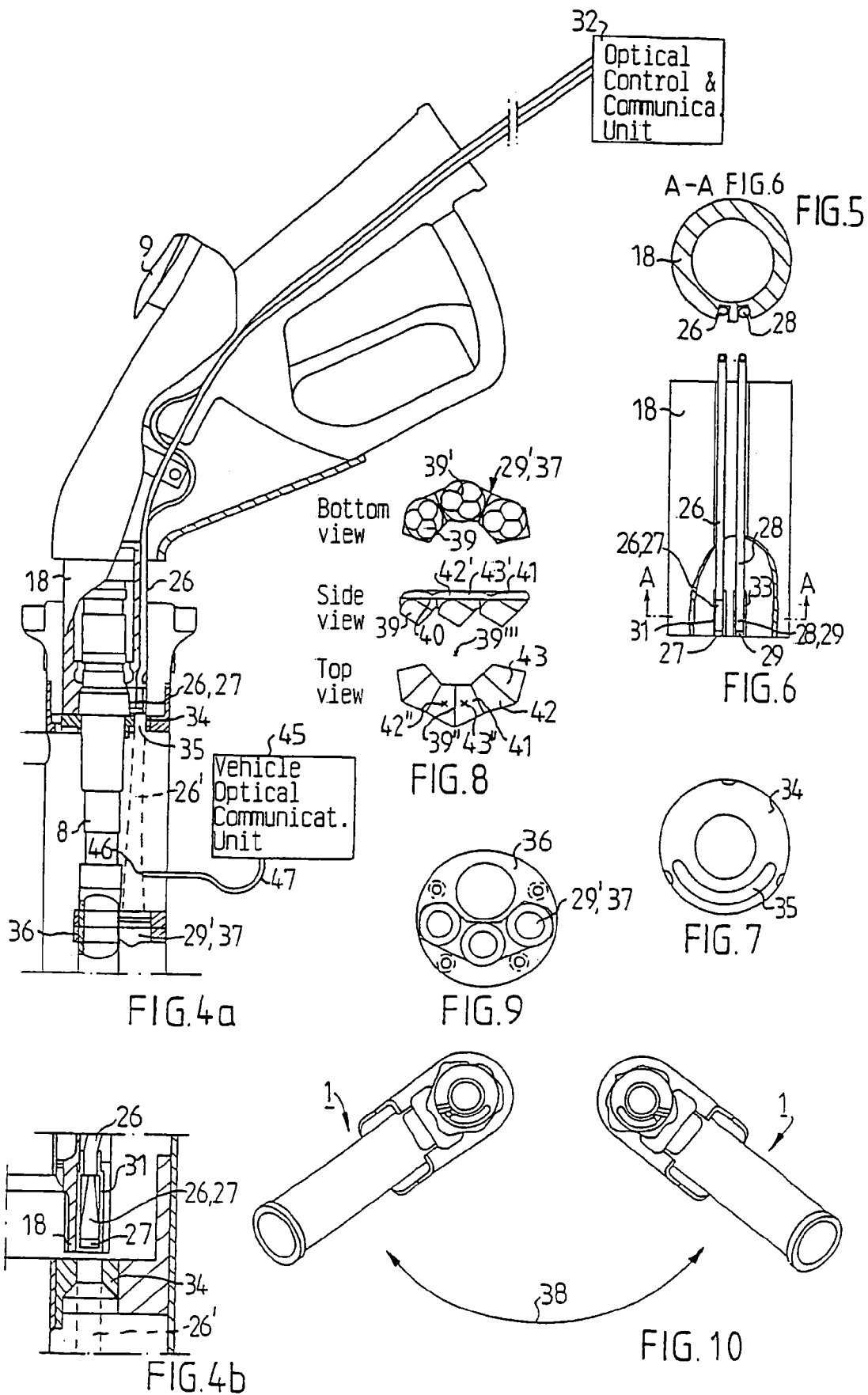

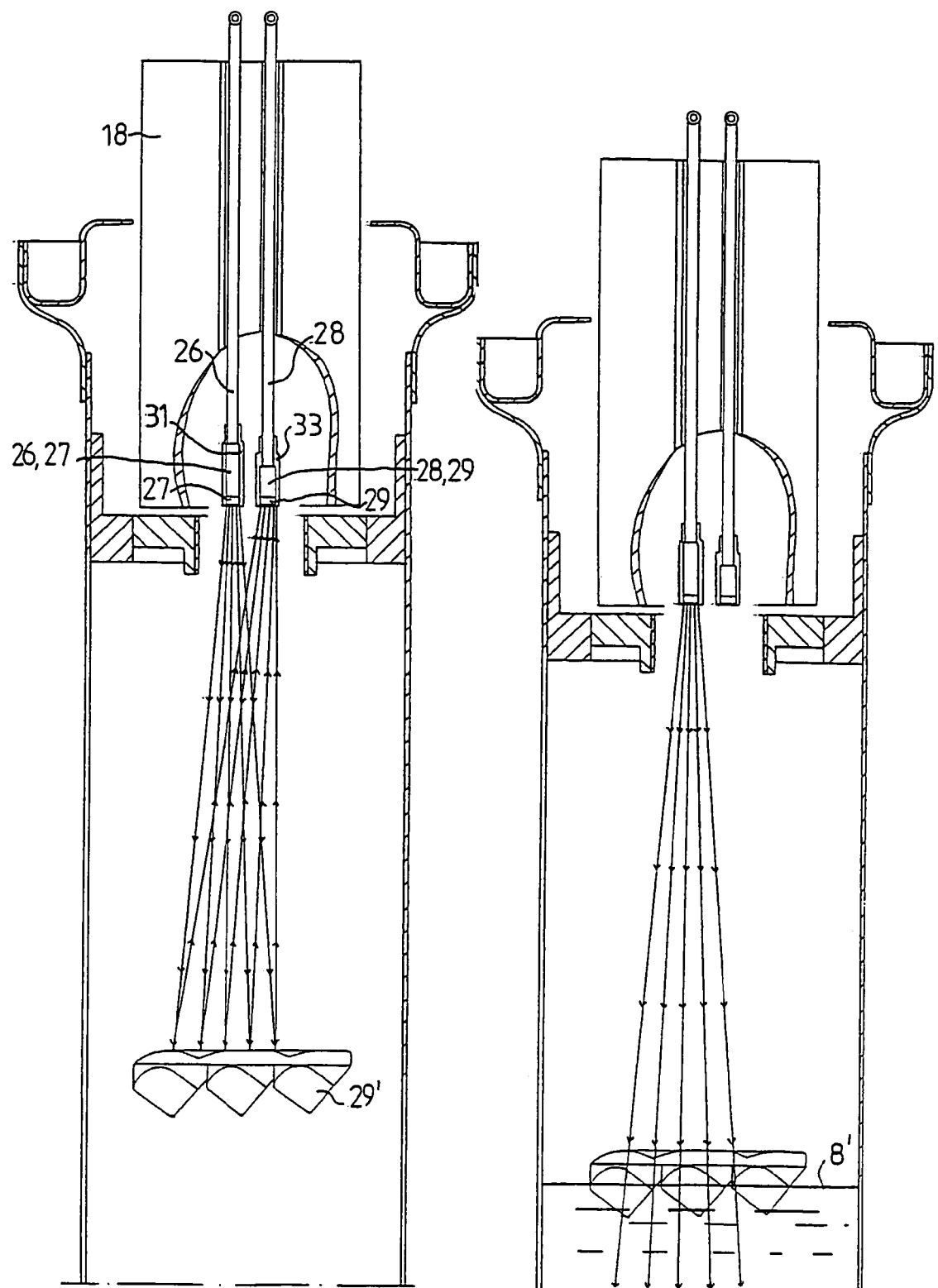

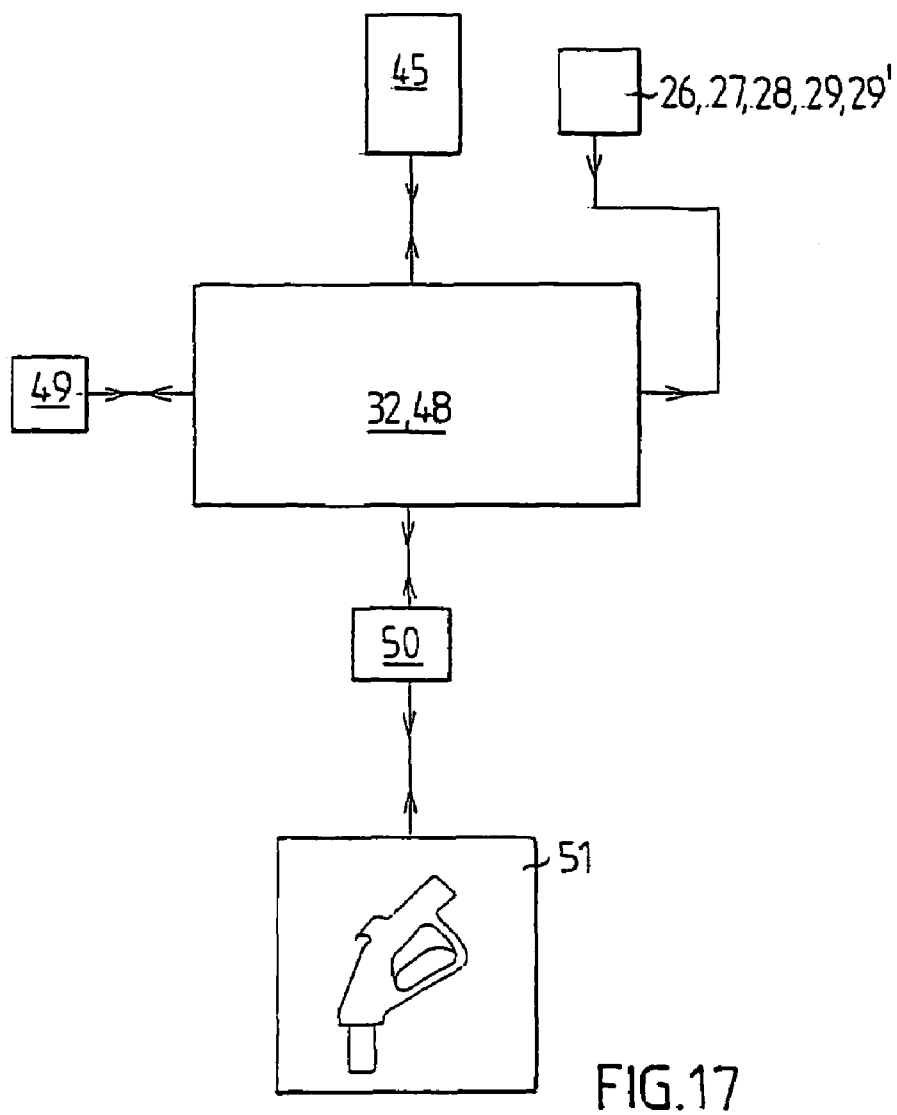
FIG. 17
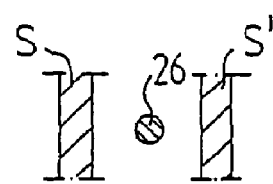
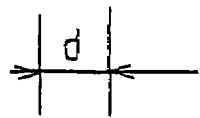
FIG. 16

METHOD AND SYSTEM FOR REFUELLING

BACKGROUND OF THE INVENTION

1. Field of the Invention

The present invention generally relates to the technical field of refuelling.

The present invention relates to a method and a system for refuelling, and a method and a device for detecting a limit fuel level and to a fuel pipe for a fuel container.

More specifically the invention relates to the technical field of spill free refuelling.

The present invention is especially suitable for the refuelling of vehicles. In such cases the fuel is sometimes inflammable and the fuel vapour is explosive. In addition to this, some fuels, like methanol, have toxic properties and the use in fuel cells is sensitive to contamination. Many vehicles are refuelled by non-professionals, i.e. persons that need an extremely safe and simple refuelling procedure and equipment. The following description of prior art, problems associated with such art and the purpose and features of the invention, will therefore, as non-limiting examples, to a certain extent be directed to this field of use. However, it should be pointed out that the invention may be used for other liquids and other refuelling objects, such as diesel oil for houses etc.

Refuelling is nowadays and will most probably also in the future be performed by non-professional operators, e.g. drivers of cars. There has also been a development towards other kinds of fuels, e.g. methanol for fuel cell use. This development calls for very secure, simple and easy-to-handle refuelling systems, considering e.g. toxic properties of such fuels. Also, extremely strict rules for use and handling of such fuels may be expected, if not already present.

2. Prior Art

Spill-free refuelling techniques are previously known. Thus, it is known to arrange a liquid-tight connection between a fuel dispensing nozzle and a fuel receiving coupling piece or nipple and to arrange an electric/electronic fuel level sensor arrangement in the fuel container. To activate the sensor arrangement, the arrangement has to be connected to a central control unit by means of a cable before refuelling. This means a quite complex procedure and several actions for the operator to remember, which leads to safety problems. Furthermore, the use of electric/electronic sensor arrangements requires quite complex and expensive arrangements to obtain a system, which is safe from a spark/fire point of view, when it comes to certain fuels, e.g. methanol.

SUMMARY OF TEE INVENTION

One object of the invention is to provide a method and a system for spill free refuelling, which are extremely simple and safe to operate.

This object is achieved by a method according to the attached claim 1 and a system according to the attached claim (19), a method according to claim (41), a device according to claim (48) and a fuel pipe arrangement according to claim (58).

According to a first aspect, the invention relates to a method according to the introductory part of claim 1, the method being especially characterized by what is specified in the characterizing portion of said claim. According to this aspect, the invention also relates to a system according to the introductory part of claim (19) the system being in particular characterized by what is specified in the characterizing clause of claim (19).

One advantage of the invention according to this aspect is that a predetermined fuel level detection configuration is established by applying the fuel dispensing gun in refuelling position, this being very simple and safe, even with a non-professional operator.

According to second aspect, the invention relates to a method according to the introductory part of claim (41), the method being especially characterized by the features of the characterizing clause of said claim. According to the same aspect, the invention also relates to a device according to the introductory portion of claim (48), the device being characterized in particular by what is specified in the characterizing clause of claim (48).

One advantage of the invention according to this aspect of the invention is that the operation procedure is optical and, thus, non-electric/non-electronic, which is most important from a safety point of view.

According to a third aspect, the present invention relates to a fuel pipe arrangement according to the introductory portion of claim (58), the arrangement being especially characterized by what is stated in the characterizing clause of the last mentioned claim.

One advantage of the invention according to this aspect is that it provides a support for level detection means in the container and provides possibilities for safe detection access to the container.

These and further aspects and advantages of the present invention will be apparent from the following description.

BRIEF DESCRIPTION OF THE DRAWINGS

A better understanding of the present invention will be had upon the reference to the following detailed description when read in conjunction with the accompanying drawings, wherein like reference characters refer to like parts throughout the several views, and in which:

FIG. 1a is a side view of a refuelling handle according to the invention, shown partly in cross section and prior to being connected to a fuel pipe arrangement;

FIG. 1b is a side view of a refuelling pipe arrangement according to the invention, shown partly in cross section and before being connected to the handle of FIG. 1a;

FIG. 2a is a side view of the handle and pipe of FIGS. 1a and b during an initial connection stage, the handle being shown in further cross-section;

FIG. 2b is a detailed view of FIG. 2a, showing a nozzle of the handle and a coupling piece or nipple of the pipe;

FIG. 3a is aside view of the arrangement according to FIG. 2a in a connection stage;

FIG. 3b is a side view of the arrangement according to FIG. 2b in the final connection stage;

FIG. 4a is a side view of the arrangement according to FIG. 3a in a connected stage, an arrangement for optical fuel level detection according to the invention also being shown;

FIG. 4b is a detailed cross section of a light transfer arrangement of FIG. 4a;

FIG. 5 is a cross section A-A of FIG. 6;

FIG. 6 is a view from the right in FIG. 4a of the light transfer arrangement in cross section;

FIG. 7 is a top view of a nipple bracket, shown in cross section in FIG. 4a and comprising an arc shaped light passage slit;

FIG. 8 is a view of a prism and lens arrangement of a level detection means according to the invention, the views from top to bottom being a bottom view, a side view and a top view;

FIG. 9 is a top view of a prism and lens holder intended to be attached to the fuel pipe according to FIG. 4a;

FIG. 10 is an illustration of an angle interval allowed for the handle in relation to the fuel pipe due to the slit and prism and lens arrangement for maintained light detection;

FIG. 11 is a view from the right in FIG. 4a and an illustration of the light transfer, reflection and detection during refuelling before a predetermined fuel level is obtained;

FIG. 12 is an illustration corresponding to FIG. 11 when said level is obtained;

FIG. 16 is a schematic representation of two spots of reflected light deviated from the light transferred to the prism and lens arrangement and to be detected; and FIG. 17 is a schematic representation of a refuelling system according to the invention.

DETAILED DESCRIPTION OF A PREFERRED EMBODIMENT

Figure 15:
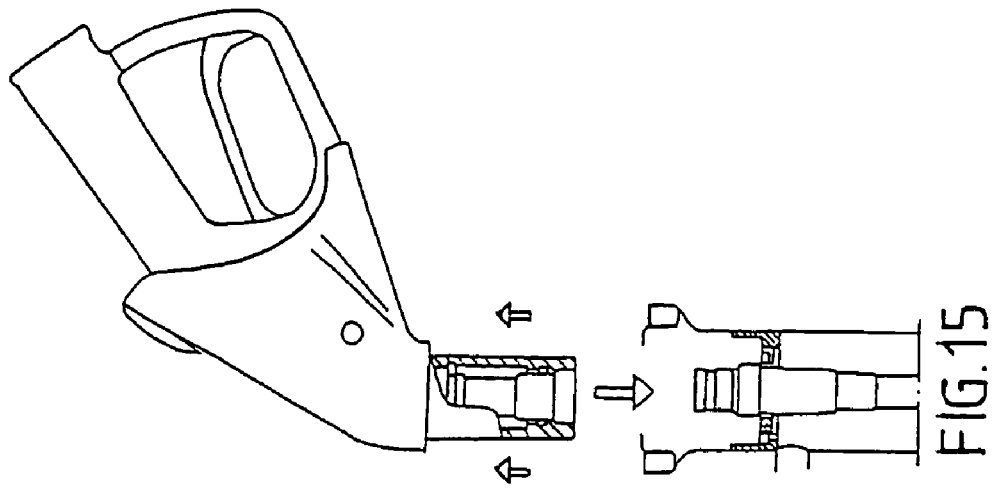
FIG. 13-15 is an illustration of disconnection of the handle pipe arrangement according to FIGS. 1a and b in three stages.

With reference first to FIGS. 1-3 the system according to the invention comprises a refuelling handle or gun 1, having a trigger 2 for starting and stopping flow through the gun and being connected to a flexible pipe 3, indicated by dashed lines, connecting the gun with a pump or the like, not shown, for fuel provision. The gun carries a nozzle 4 arranged to be part of a liquid tight, so called spill free, connection, the other part being a coupling piece 5 or nipple 5 carried by the object 6 to be refuelled, not shown specifically, through which coupling piece fuel is intended to be provided to a fuel container 7 of said object, said coupling piece being fixed to the upper part of a fuel pipe 8 arranged in the fuel container.

A preferred embodiment of the coupling and connection arrangement is shown in FIGS. 1-3, said arrangement comprising an indication and release means in the form of a knob 9 arranged to be seen and reached by an operator of the gun and preferably being arranged in an opening 10 in the gun cover 11 near the trigger so that it is operable by a one hand grip around the gun-handle and trigger part 12 of the gun. According to the embodiment shown the knob is carried by one end part 13 of a linkage arm 14, the linkage arm being arranged to be turned around a centrally positioned joint 15 between a release position, FIG. 2a, and a coupling position, FIG. 3a, and to, by its other end part 16, co-act with a release ring 17, which is tiltably connected to an outer sleeve 18 of the nozzle at the part 19 of the sleeve, which is turned to the knob said outer sleeve being arranged to be moved towards the coupling piece in relation to the release ring and an inner nozzle part 20 during the nozzle and coupling piece connection procedure, as can be seen in detail in FIGS. 2b and 3b, where by the release ring is tilted and levelled out against a connection sleeve 21 of said inner nozzle part and whereby the release ring turns the linkage arm and the knob from said release position to said coupling position, as indicated by an arrow 9' in FIG. 3a.

The release ring has an extension 22 arranged to co-act with the linkage arm end and is preferably connected to the outer sleeve by means of two Allen key bolts 23 attached to the release ring with their heads 24 acting as glide bearings in corresponding holes, not shown, in the outer sleeve. In order to securely hold the nozzle in place, locking balls 25 at the inner surface of the outer sleeve are provided and arranged to be forced by the outer sleeve into a grove 25' in the coupling piece, as can be seen in FIGS. 2b and 3b.

Figure 14:
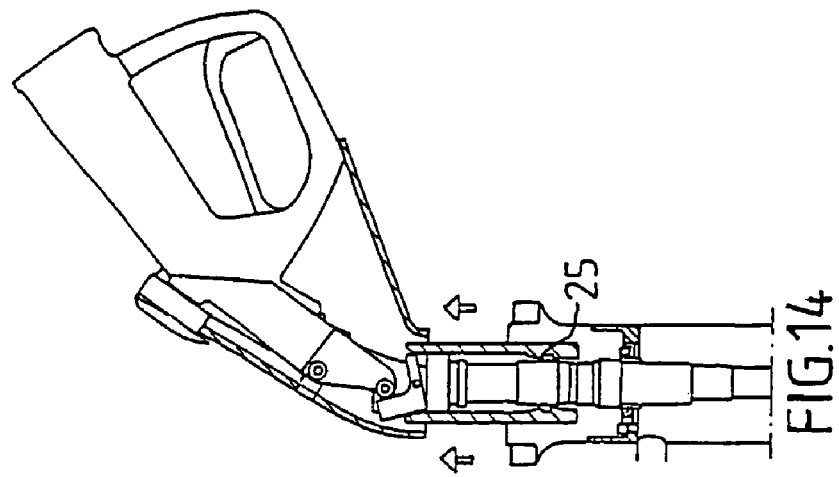
Figure 13:
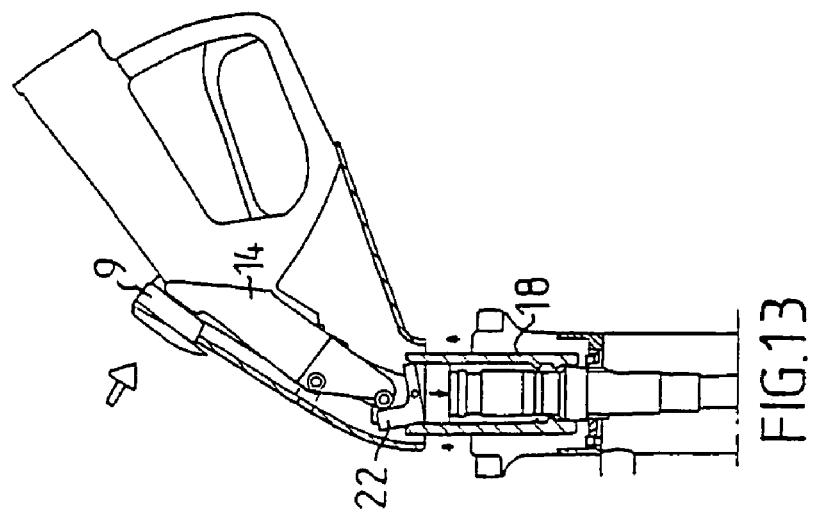

The connection is arranged to be released as can be seen in FIGS. 13-15, an operator pushing the knob and linkage arms from the coupling position to the release position and thereby tilting the release ring, which, due to its attachment to the outer sleeve is arranged to push the connection sleeve 21 towards the nozzle free end and thereby releasing the coupling piece from the nozzle, as shown in the Figures.

The fuel connection for transferring fuel from the nozzle to the coupling piece or nipple of the fuel-receiving object is, in order to obtain a spill-free connection, preferably of the type where the nozzle and the coupling piece are arranged so that the fuel connection is opened in successive steps during the coupling procedure, the nozzle being arranged to open the coupling piece and the coupling piece being arranged to open the nozzle thereafter and vice versa when closing, the nozzle being closed before the coupling piece being closed.

The system according to the invention further comprises means for detecting a predetermined fuel level in the fuel container and for automatically interrupt the fuel flow when said level is detected. The system is arranged so that a level detection configuration is established by means of moving the gun 1 into position for establishment of the liquid tight connection. A preferred embodiment is shown in FIGS. 4-12.

Carried and supported by the gun is an optical fibre 26 and lens 27 arrangement arranged for transferring a beam of optical detection signals 26' to the container and an optical fibre 28 and lens 29 arrangement for receiving optical detection signals, reflection means 29' being arranged in the fuel container to receive optical signals, preferably in the form of visible light, transferred to the container, the reflection means being arranged to reflect the optical signals when the fuel level has not yet reached the reflection means and to transmit a considerable part of the optical signals when the fuel has reached the reflection means due to a change in refractory configuration, the change in reflected signal being intended to be taken as an indication for the fuel to have reached the predetermined level, as shown in FIGS. 11 and 12.

According to the embodiment shown, the optical fibre 26 and the lens 27, constituting a light source, for transferring optical signals are held together by a lens holder 31 arranged in a grove in the outer surface of the outer sleeve, signals being provided from a control and communication central unit 32, and the optical fibre 28 and lens 29 arrangement, constituting a light sensor for receiving reflected signals, are held together by a lens holder 33 arranged in a grove in the outer surface of the outer sleeve relatively close to the transfer arrangement 26, 27, preferably about 6 mm:s therefrom, both arrangements being positioned at the end of the outer sleeve. The lenses 27, 29 are arranged to concentrate the light.

Said nipple or coupling piece is held by a nipple bracket 34, against which the outer sleeve is intended to be applied, the nipple bracket comprising a, preferably arc-shaped, slit 35 through which optical signals are intended to pass from and to said arrangements 26, 27 and 28, 29 respectively.

The reflection means are arranged in a holder 36 attached to the internal fuel pipe below the slit, the slit and the reflection means being fixed in relation to each other.

The reflection means are arranged so that a certain deviation between transferred optical signals and reflected optical signals is provided, so that the transfer and sensor arrangements may be positioned close together, as discussed below.

The reflection means comprises a prism and lens arrangement 37, preferably having an arc-shaped configuration having the same or approximately the same reflection properties irrespective of where along the arrangement optical signals are coming in, whereby the gun may be applied and turned within a certain angle interval 38, FIG. 10, substantially maintaining the effective reflection properties.

According to the preferred embodiment the reflection means comprises at least one so-called cube corner prism 39 of the kind that is arranged to reflect in coming light back in substantially the opposite direction and having the configuration of a cut-off cube corner, the surface 40 of cut corresponding to a light receiving surface 40, against which light to be reflected is intended fall in.

The embodiment shown, specifically shown in FIG. 8, comprises three cube corners 39 in an arc-shaped row in order to obtain an elongated reflection means, preferably adapted to the shape of the slit 35.

As described above the predetermined level is intended to be detected as a change in the reflected optical signal from high to low signal level corresponding to transmission instead of reflection. In order to keep this signal change far above stray light level in the environment of the reflection means, complementary optics 41 for the cube corner prisms are preferably provided, intended to increase the high (reflection configuration) signal level, said optics being arranged on the top surface 40 of each cube corner prism. According to one embodiment the complementary optics for each cube corner prism comprises a spherical lens part 42 and a cylindrical lens part 43. Each part 42, 43 constitutes a portion of a lens, the central portions 42', 43' of the two parts abutting each other and the optical axes 42", 43" of the two parts being off-set with respect to each other and with respect to the centre 39' of the cube corner prism, the optical signal coming in against one half being intended to be reflected and through the abutting half and the line of cut 39" between the two half lenses being directed towards the rotation centre 39''' of the mechanical system and passes the centre axes 39' of the cube corner prism. Each of the two halves for each cube corner prism is arranged to deviate transferred and reflected optical signals respectively in the same direction and to concentrate the reflected signals to two spots S, S', FIG. 16, a short distanced, preferably about 6 mm:s, beside the optical signal transfer arrangement 26, 27, one on each side, one of the spots thus being intended to fall on the optical signal receiving arrangement or sensor 28, 29. This provides for possibilities to choose the cut off level between high and low in such a way that it is not so noise sensitive.

The complementary optics 41 described above is a solution based upon standard lenses, the basic aim, however, being to compensate for poor tolerances with respect to the positioning of the transfer arrangement 26, 27 carried by the handle. The cylindrical lens is "off-spherical" for such compensation. One alternative is to design both lens halves to have an "off-spherical" shape.

According to the preferred embodiment means for detecting complete and secure connection between the nozzle and the coupling piece by means of the level detection signalling configuration are provided, said configuration being fully established when said connection is completed. According to one embodiment shutter means 44, FIG. 3a, of the linkage arm arrangement for said knob is provided by means of which reflected optical signals are stopped from being communicated to further processing when said knob and linkage arm is in the release position, said communication being opened by moving said shutter means when the knob is moved to the coupling position.

In order to provide for communication with the fuel receiving object 6 a two-way optical communication between an optical communication unit 45 of said object carried by the object is arranged for communication with the optical control and communication central unit. According to a preferred embodiment, the two-way optical communication is arranged by means of light decoding and a communication prism 46 with a dual optical communication fibre 47 connected to the object optical communication unit 45.

In FIG. 17, a schematic illustration of a system for performing the invention is shown. The system comprises a central control and communication unit 48 including the optical control and communication unit 32. The central unit is preferably connected to an ID-unit 49 by means of which an operator may identify himself by means of a card, code etc. before refuelling for billing purposes etc. in order to "log in" and obtain access to the refuelling system. Connected to the central unit is, as earlier described, an object optical communication unit for transfer and reception of information to and from, respectively, the central unit, this information being e.g. the correct fuel type, object ID etc. for control etc.

Thus, the central unit is arranged to receive information from the detection means 26, 27, 28, 29, 29' as to when said predetermined limit fuel level 8' is obtained, and is connected to valve means 50, e.g. a magnetically operated valve of the pump and dispensing arrangement 51 of the system, said valve being arranged to receive close and open orders from the central unit and, more specifically a close order when the limit level is obtained and open order after re-setting of the system corresponding to a new refuelling cycle or continuation of an interrupted refuelling, the system having a delay function, interrupting refuelling access when refuelling activity has not occurred for a predetermined time period, etc.

The methods as well as the function of the systems, devices and arrangements according to the invention should to a considerable extent have been made clear from the description given above.

Thus, after having been logged into the refuelling system, an operator applies the dispensing nozzle onto the coupling piece and establishes connection for fuel transfer, indication of success being made by the knob 9. At the same time the optical limit level detection configuration is established if the gun is within the approved angle interval 38 and the central unit receives reflected signal information. The valve means are given order to open and refuelling can start by trigger 2 action. When the predetermined level is reached or when the operator pushes the knob to the release position or a predetermined interruption has occurred, the corresponding signals are detected by the central unit, which gives close order to the valve means. Release of the connection is then performed as described earlier.

The invention has been described above in association with preferred embodiments. Of course further embodiments and minor amendments and complementary changes may be imagined without leaving the basic inventive idea.

Thus, for security reasons a break point arrangement, not shown, is provided; preferably on the pipe 3 leading to the gun, to obtain a break if the operator eg drives off without releasing the connection, the breakpoint arrangement being resettable and comprising a valve arrangement for spill free break.

Further, the prism and lens parts of the reflection means are preferably made of one or more polymeric materials chosen to provide proper optical properties and to resist the fuels to be used, eg gasoline, methanol, ethanol or mixtures of such fuels.

The prism and lens arrangement of the reflection means may be designed differently than according to the embodiments shown and described above, expecially in view of the fact that the arrangement may be made from polymeric materials. Thus, an arrangement may be imagined, which comprises several rows of cube corner prisms, each with a lens arrangement. Other patterns, eg with straight rows and rows in which the prisms are arranged at a certain distance from each other are also imaginable. Further, prism and lens arrangements made in one piece may be imagined, and said piece may be cut from a larger piece having the same prism and lens configuration.

The invention claimed is:

1. Method for spill-free refueling, the method comprising the steps of:
   establishing a liquid-tight connection between a nozzle of a refueling gun for fuel dispensing and a coupling piece of a fuel receiving object, fuel being provided through the fuel receiving object to a fuel container;
   detecting a predetermined fuel-fill level in the fuel container; end
   automatically interrupting the fuel flow when fuel is detected at said level,
   wherein a level detection signaling configuration for detecting the predetermined fuel level in the fuel container is established by moving the gun (1) into position for establishment of the liquid-tight connection, wherein complete and secure connection between the nozzle and the coupling piece is detected by means of the level detection signaling configuration, said configuration being fully established when said connection is completed.

2. Method according to claim 1, wherein signals (26') for detecting said predetermined level are transferred to the fuel container (7) from. means (26, 27) carried and supported by the gun.

3. Method according to claim 1, wherein a signal corresponding to detection of said predetermined level is transferred to receiving means (28, 29), carried and supported by the gun for further processing.

4. Method according to claim 1, wherein said predetermined level is detected by means of optical signals.

5. Method according to claim 4, wherein optical signals (26') are transferred from an optical fiber (26) and lens (27) arrangement on the gun and optical signals are received by an optical fiber (28) and lens (29) arrangement on the gun.

6. Method according to claim 4, wherein optical signals are transferred to reflection means (29', 37) in the container, the reflection means being arranged to reflect the optical signals when the fuel level has not reached the reflection means and to transmit a considerable part of the optical signals when the fuel has reached the reflection means due to a change in refractory configuration, and in that the change in reflected signal is taken as an indication for the fuel to have reached the predetermined level.

7. Method according to claim 6, wherein the reflection means obtains a deviation between transferred optical signals and reflected optical signals so that means for transfer (26, 27) and means for receiving (28, 29) can be positioned close together on the gun.

8. Method according to claim 7, wherein a distance (d) between said means for transfer (26, 27) and said means for receiving (28, 29) is about 6 mm.

9. Method according to claim 6, wherein reflection of transferred optical signals is obtained by a prism and lens arrangement (37) being configured so that approximately the same reflection properties are obtained irrespective of where along said arrangement (37) transferred optical signals are coming in, whereby the gun may be applied and turned within a certain angle interval (38) substantially maintaining the effective reflection properties.

10. Method according to claim 9, wherein optical signals are transferred through a slit (35) on the fuel receiving object side of the connection, the slit being fixed in relation to the reflection means, the slit setting said angle interval.

11. Method according to claim 9, wherein the prism and lens arrangement (37) has an arc-shaped configuration.

12. Method according to claim 6, wherein reflection is obtained by at least one cube corner prism (39).

13. Method according to claim 12, wherein reflection is obtained by at least three cube corner prisms arranged in a row.

14. Method according to claim 12, wherein each cube corner prism is provided with complementary optics (41) in the form of two lens parts (42, 43) for obtaining a deviation between transferred optical signals and reflected optical signals and for concentration of the reflected optical signals.

15. Method according to claim 6, wherein a fuel pipe (8) carries the reflection means, the fuel pipe being through which fuel is entered into the fuel container and which ends below said predetermined fuel level (8').

16. Method according to claim 6, wherein the optical signals are in the form of visible light.

17. Method according to claim 4, wherein completed and acceptable connection between the nozzle and the coupling piece is indicated by a mechanical indication and release arrangement of the gun by moving a release knob (9) from a release position to a coupling position, release of the connection being initiated by an operator pushing said knob back to the release position.

18. Method according to claim 17, wherein reflected optical signals, are stopped from being communicated to further processing by shutter means (44) of a linkage arm (14) arrangement for the knob when said knob is in the release position, said communication being opened by moving said shutter means when the knob is moved to said coupling position.

19. Method according to claim 1, wherein the fuel connection between the nozzle and the coupling piece is opened in successive steps during the coupling procedure, the nozzle opening the coupling piece before the coupling piece opens the nozzle, and, when closing, the nozzle is closed before the coupling piece is closed.

20. Method according to claim 1, wherein the level detection signaling configuration comprises a two-way optical communication between an object optical communication unit (45) and an optical control and communication unit (32).

21. System for spill-free refueling, comprising:
    means for establishing a liquid-tight connection between a nozzle of a refueling gun for fuel dispensing and a coupling piece of a fuel receiving object, through which fuel is intended to be provided to a fuel container of said object; and
    means for detecting a predetermined fuel-fill level in the fuel container and for automatically interrupting the fuel flow when fuel is detected at said level,
    wherein a level detection signaling configuration for detecting the predetermined fuel level in the fuel container is configured to be established by means of moving said gun (1) into position for establishment of the liquid-tight connection, and means (28, 44) for detecting complete and secure connection between the nozzle and the coupling piece by means of the level detection signaling configuration, said configuration being fully established when said connection is completed.

22. System according to claim 21, wherein means (26, 27) carried and supported by the gun are provided for transferring signals (26') for detecting said predetermined level (8') to fuel container (7).

23. System according to claim 21, wherein receiving means (28, 29) carried and supported by the gun are provided for receiving a signal corresponding to detection of said predetermined level (8') for further processing.

24. System according to claim 21, further comprising:
optical signals (26') for detecting said predetermined level.

25. System according to claim 24, further comprising:
an optical fiber (26) and lens (27) arrangement on the gun for transferring optical detection signals (26'); and
an optical fiber (28) and lens (29) arrangement on the gun for receiving optical signals.

26. System according to claim 24, further comprising:
reflection means (29', 37) arranged in the container (7) for receiving optical signals transferred to the container,
the reflection means being arranged to reflect the optical signals when the fuel level has not reached the reflection means and to transmit a considerable part of the optical signals when the fuel has reached the reflection means due to a change in refractory configuration and in that the change in reflected signal is taken as an indication for the fuel to have reached the predetermined level.

27. System according to claim 26, wherein the reflection means are arranged so that a certain deviation between transferred optical signals (26') and reflected optical signals is provided, so that means for transfer (26, 27) and means for reception (28, 29) are postionable close together on the gun.

28. System according to claim 27, wherein a distance (d) between said means for transfer (26, 27) and said means for receiving (28, 29) is about 6 mm.

29. System according to claim 26, further comprising:
a prism and lens arrangement (37) for reflection of transferred optical signals (26') having the same or approximately the same reflection properties irrespective of where along said arrangement transferred optical signals are coming in, whereby the gun may be applied and turned within a certain angle interval (38) substantially maintaining the effective reflection properties.

30. System according to claim 29, further comprising:
a slit (35) on the fuel receiving side of the connection, through which the optical signals (26', 28') are intended to pass, said slit fixed in relation to the reflection means and setting said angle interval.

31. System according to claim 30, wherein said slit is arc-shaped.

32. System according to claim 29, wherein said prism and lens arrangement (37) has an arc-shaped configuration.

33. System according to claim 26, wherein said reflection means comprises at least one cube corner prism (39).

34. System according to claim 33, wherein said reflection means comprises at least three cube corner prisms arranged in a row.

35. System according to claim 34, wherein the at least three cube corner prisms are arranged in an arc-shaped row.

36. System according to claim 33, wherein each cube corner prism is provided with complementary optics (41) in the form of a lens arrangement for obtaining a deviation between transferred optical signals (26') and reflected optical signals (28') and for concentration of the reflected optical signals.

37. System according to claim 36, wherein said complementary optics comprise two lens parts (42, 43) arranged on a top surface (40) of a cube corner prism, each of said two lens parts being a portion of a lens, central portions (42', 43') of said two lens parts abutting each other, and being arranged so that optical signals coming in against one of said two lens parts is reflected through an other of said two lens parts, the optical axes of the two lens parts being off-set with respect to each other and the center (39') of the prism.

38. System according to claim 37, wherein the general configuration of the two lens parts are off-spherical, whereby the one of said two lens parts is spherical and the other of said two lens parts is cylindrical, or both of said two lens parts are off-spherical, in order to accumulate lack of tolerances with respect to positioning of the optical signal transfer arrangement.

39. System according to claim 26, wherein said optical signals are in the form of visible light.

40. System according to claim 24, further comprising:
a mechanical indication and release arrangement of the gun for indication of complete and acceptable connection between the nozzle and the coupling piece by moving a release knob (9) from a release position to a coupling position, and release of the connection being initiated by an operator pushing said knob (9) back to the release position.

41. System according to claim 40, wherein the release knob (9) is supported by a linkage arm (14) configured to co-act with a release ring (17) tiltably connected to an outer sleeve (18) of the nozzle, said sleeve being intended to be moved towards the coupling piece in relation to the release ring and an inner nozzle part (20) during the nozzle and coupling piece connection procedure, whereby the release ring is tilted and leveled out against a connection sleeve (21) of said inner nozzle part and whereby the release ring turns the linkage arm and the knob to said coupling position and in that, during release of the nozzle from the coupling piece, the linkage arm, by an operator pressing the knob to said release position, being configured to tilt the release ring, which due to its attachment to the outer sleeve is configured to push the connection sleeve towards the nozzle free end and thereby releasing the coupling piece from the nozzle.

42. System according to claim 40, further comprising:
shutter means (44) of a linkage an arrangement for said knob, by means of which reflected optical signals are stopped from being communicated to further processing when said knob is in the release position, and in that said communication is opened by moving said shutter means when the knob is moved to said coupling position.

43. System according to claim 21, wherein the fuel connection between the nozzle and the coupling piece is configured so that the fuel connection is opened in successive steps during the coupling procedure, the nozzle being configured to open the coupling piece and the coupling piece being configured to open the nozzle thereafter and, when closing, the nozzle is closed before the coupling piece is closed.

44. System according to claim 21, wherein a fuel pipe (8) is provided through which fuel enters into the fuel container, said pipe acting as a support for a reflection means (29') and ending below said predetermined level (8').

45. System according to claim 21, further comprising:
a two-way optical communication between an object optical communication unit (45) of the fuel receiving object carried by the object and an optical control and communication central unit (32).

46. System according to claim 45, wherein said two way optical communication is arranged by means of light decoding and a communication prism (46) co-acting with a dual optical communication fiber (47) connected to the object optical communication unit (45).

\* \* \* \* \*